(12) United States Patent
Maier et al.

(10) Patent No.: US 9,764,624 B2
(45) Date of Patent: Sep. 19, 2017

(54) SHADING DEVICE FOR A TRANSPARENT SURFACE PART OF A MOTOR VEHICLE

(71) Applicants: Matthias Maier, Esslingen (DE); Herbert Walter, Ebersbach (DE)

(72) Inventors: Matthias Maier, Esslingen (DE); Herbert Walter, Ebersbach (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/813,275

(22) Filed: Jul. 30, 2015

(65) Prior Publication Data

US 2016/0031295 A1    Feb. 4, 2016

(30) Foreign Application Priority Data

Aug. 1, 2014    (DE) .................. 10 2014 215 150

(51) Int. Cl.
*B60J 1/20*    (2006.01)

(52) U.S. Cl.
CPC ............. *B60J 1/2063* (2013.01); *B60J 1/208* (2013.01); *B60J 1/2027* (2013.01); *B60J 1/2044* (2013.01); *B60J 1/2052* (2013.01)

(58) Field of Classification Search
CPC ...... B60J 1/2063; B60J 1/2027; B60J 1/2052; B60J 1/208; B60J 1/2044

(Continued)

(56) References Cited

U.S. PATENT DOCUMENTS

| 528,071 A | 10/1894 | Branshaw |
| 5,067,546 A * | 11/1991 | Jeuffray ................. B60J 1/2063 |
| | | 160/23.1 |

(Continued)

FOREIGN PATENT DOCUMENTS

| DE | 100 19 787 A1 | 10/2001 |
| DE | 10 2004 017 023 A1 | 10/2005 |

(Continued)

OTHER PUBLICATIONS

European Search Report issued in Application No. EP 15 17 3761 with English translation of category of cited documents dated Dec. 7, 2015 (8 pages).

(Continued)

*Primary Examiner* — Blair M Johnson
(74) *Attorney, Agent, or Firm* — Flynn, Thiel, Boutell & Tanis, P.C.

(57) ABSTRACT

Shading device for a transparent surface part of a motor vehicle having a shading structure, two non-parallel lateral guide arrangements fixed with respect to the vehicle and flanking a displacement travel of the shading structure on opposite sides, and a pull-out profile which, at opposite face sides, is displaceable by in each case one guide carriage, lateral shading structure sections protruding, in a manner dependent on the displacement travel of the shading structure, into lateral receiving spaces fixed with respect to the vehicle and assigned to the guide arrangements. Each lateral guide arrangement and the associated receiving space are integrated in one housing structure fixed with respect to the vehicle and having a guide slot for the passage of the guide carriage from the pull-out profile to a drive device the guide slot running along the displacement travel of the shading structure and opening toward the latter.

8 Claims, 4 Drawing Sheets

(58) Field of Classification Search
USPC .................................................. 160/370.22
See application file for complete search history.

(56) References Cited

U.S. PATENT DOCUMENTS

| | | | |
|---|---|---|---|
| 6,179,373 B1* | 1/2001 | Bohm | B60J 7/0015 |
| | | | 160/273.1 |
| 6,227,601 B1 | 5/2001 | LaFrance | |
| 6,422,291 B1 | 7/2002 | Brunnert et al. | |
| 6,739,375 B2* | 5/2004 | Schlecht | B60J 1/2027 |
| | | | 160/370.22 |
| 7,059,651 B2* | 6/2006 | Bohm | B60J 7/0023 |
| | | | 296/214 |
| 7,896,057 B2 | 3/2011 | Walter et al. | |
| 8,113,265 B2 | 2/2012 | Hardison et al. | |
| 8,905,116 B2 | 12/2014 | Weinbrenner | |
| 2001/0017194 A1 | 8/2001 | Schlecht et al. | |
| 2002/0033244 A1* | 3/2002 | Schlecht | B60J 1/2027 |
| | | | 160/370.22 |
| 2007/0144689 A1 | 6/2007 | Walter et al. | |
| 2010/0000692 A1* | 1/2010 | Coenraets | E06B 9/581 |
| | | | 160/323.1 |
| 2012/0186756 A1* | 7/2012 | Lin | B60J 1/2044 |
| | | | 160/323.1 |
| 2016/0031294 A1 | 2/2016 | Maier et al. | |
| 2016/0031295 A1* | 2/2016 | Maier | B60J 1/2011 |
| | | | 160/370.21 |
| 2016/0031296 A1* | 2/2016 | Maier | B60J 3/02 |
| | | | 296/97.8 |
| 2016/0031297 A1* | 2/2016 | Maier | B60J 3/0226 |
| | | | 296/97.4 |

FOREIGN PATENT DOCUMENTS

| | | |
|---|---|---|
| DE | 10 2012 222 658 A1 | 6/2014 |
| EP | 1 123 825 A2 | 8/2001 |
| EP | 1 582 386 B1 | 10/2005 |
| EP | 1 800 922 A1 | 6/2007 |
| WO | WO 2014/090759 A1 | 6/2014 |

OTHER PUBLICATIONS

Office Action of German Patent Office issued in Application No. 10 2014 215 150.3 dated Apr. 7, 2015 (5 pages).

* cited by examiner

SHADING DEVICE FOR A TRANSPARENT SURFACE PART OF A MOTOR VEHICLE

CROSS-REFERENCE TO RELATED APPLICATIONS

This claims priority from German patent application DE 10 2014 215 150.3, the disclosure of which is hereby incorporated by reference in its entirety.

FIELD OF THE INVENTION

The invention relates to a shading device for a transparent surface part of a motor vehicle, having a flexible shading structure which can be displaced between a rest position, in which it is stowed in a compact manner, and a shading position, in which it covers the transparent surface part, in a vehicle interior, having two non-parallel lateral guide arrangements which are fixed with respect to the vehicle and which flank a displacement travel of the shading structure on opposite sides, and having a dimensionally stable pull-out profile which is arranged on a front face end region of the shading structure as viewed in the pulling-out direction, the pull-out profile, at its opposite face sides, being displaceable in parallel fashion by means of in each case one guide carriage in the respective lateral guide arrangement by way of drive means which engage on the guide carriages, and lateral shading structure sections protruding, in a manner dependent on the displacement travel of the shading structure, into lateral receiving spaces which are fixed with respect to the vehicle and which are assigned to the opposite guide arrangements.

BACKGROUND OF THE INVENTION

A shading device of said type is known from EP 1 800 922 B1. The known shading device is assigned to a rear window arrangement of a passenger motor vehicle and has a flexible shading structure which, in the manner of a web, is held, such that it can be wound up and unwound, on a winding shaft which is mounted rotatably underneath a rear parcel shelf of the vehicle interior. At its front face end region as viewed in the pulling-out direction, the shading structure is assigned a pull-out profile which, by way of drive means, can be displaced in parallel fashion in lateral guide arrangements, which are fixed with respect to the vehicle, between the rest position of the shading structure and the shading position of the shading structure. The lateral guide arrangements which are fixed with respect to the vehicle are oriented non-parallel with respect one another. The shading structure has a substantially rectangular web shape. The pull-out profile is guided in longitudinally displaceable fashion by way of guide carriages in the opposite lateral guide arrangements. For this purpose, corresponding guide channels are provided in the opposite lateral guide arrangements. Flexible shafts of the drive means run in the guide channels, which flexible shafts effect displacement of the guide carriages. Furthermore, the lateral guide arrangements comprise receiving spaces into which the lateral shading structure sections protrude, these being stabilized at the face side by the lateral guidance strip sections of the transverse guidance strip.

SUMMARY OF THE INVENTION

It is an object of the invention to provide a shading device of the type mentioned in the introduction which is of simple and compact construction.

Said object is achieved in that each lateral guide arrangement and the associated receiving space are integrated in each case one housing structure which is fixed with respect to the vehicle and which has a common guide slot for the passage of the guide carriage from the pull-out profile to the drive means and of the respective lateral shading structure section to the receiving space, the guide slot running along the displacement travel of the shading structure and being open toward the latter. By means of the solution according to the invention, only a single guide slot is provided in the region of each lateral guide arrangement, said guide slot serving for both the displacement of the guide carriage and the passage of lateral shading structure sections of the shading structure. This permits a simple design of the housing structure. Furthermore, in this way, a compact configuration of the housing structure can be attained. By virtue of the fact that both the respective lateral guide arrangement and the associated receiving space on each side are integrated in each case one housing structure which is fixed with respect to the vehicle, simple and low-tolerance preassembly of the shading device is made possible. The solution according to the invention is particularly advantageously suited to the shading of a rear window arrangement of a passenger motor vehicle. The shading device according to the invention may however also be provided for other transparent surface parts of the vehicle interior such as side windows or front windows or transparent roof parts.

In a refinement of the invention, the opposite guide slots extend in each case at least largely rectilinearly and are arranged in a common plane which corresponds to a pulling-out plane of the shading structure between the rest position and the shading position. The at least largely rectilinear extent of the guide slots and thus of the lateral guide arrangements are to be understood to mean longitudinal extent with a curvature of between 0 and 2%. The arrangement of the guide slots in the pulling-out plane of the shading structure permits reliable deployment and retraction of the shading structure relative to the rest position and reliable protrusion of the lateral shading structure sections into the receiving spaces of the guide arrangements which are fixed with respect to the vehicle.

In a further refinement of the invention, the guide slots are open toward the receiving spaces of the housing structures. In this way, on both sides of the shading structure, it is ensured that the lateral shading structure sections, together with the lateral guidance strip sections of the transverse guidance strip, can reliably penetrate through the guide slots and protrude into the receiving spaces.

In a further refinement of the invention, in each housing structure, there is provided a receiving space for a linear guide of a drive transmission strand of the drive means and a receiving space for the respective lateral shading structure section to protrude into, the receiving space for the drive transmission strand being arranged above the guide slot and the receiving space for the shading structure section being arranged laterally adjacent to or below the guide slot. This is a configuration which is particularly compact and of particularly simple construction. The receiving space for the linear guide of the drive transmission strand preferably constitutes a guide channel in which a drive transmission strand which is rigid under compression, and which is advantageously in the form of a threaded shaft (also referred to as flexible shaft), is guided.

In a further refinement of the invention, walls of the receiving spaces are formed partially by body wall sections which are in contact with the housing structure. In this refinement, the respective housing structure can be supplemented, so as to form a corresponding receiving space, by corresponding body wall sections, against which the housing structure bears and to which the housing structure may be fixedly connected. In this way, the configuration of the housing structure can be simplified and adapted to existing installation spaces within a passenger motor vehicle.

Further advantages and features of the invention will emerge from the claims and from the following description of a preferred exemplary embodiment of the invention, which is illustrated on the basis of the drawings.

DETAILED DESCRIPTION

Figure 1:
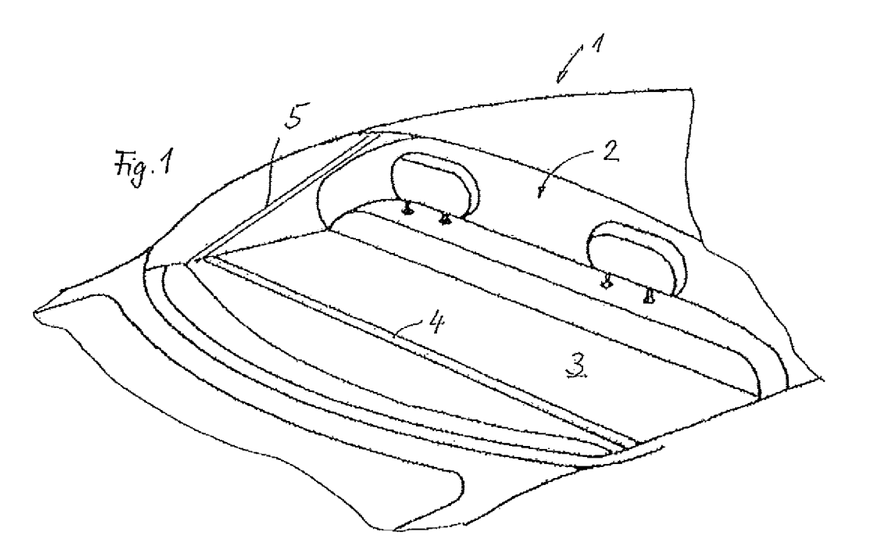
FIG. 1 schematically shows a part of a passenger motor vehicle in the region of a rear window arrangement, which at the vehicle interior side is assigned an embodiment of a shading device according to the invention.
Figure 2:
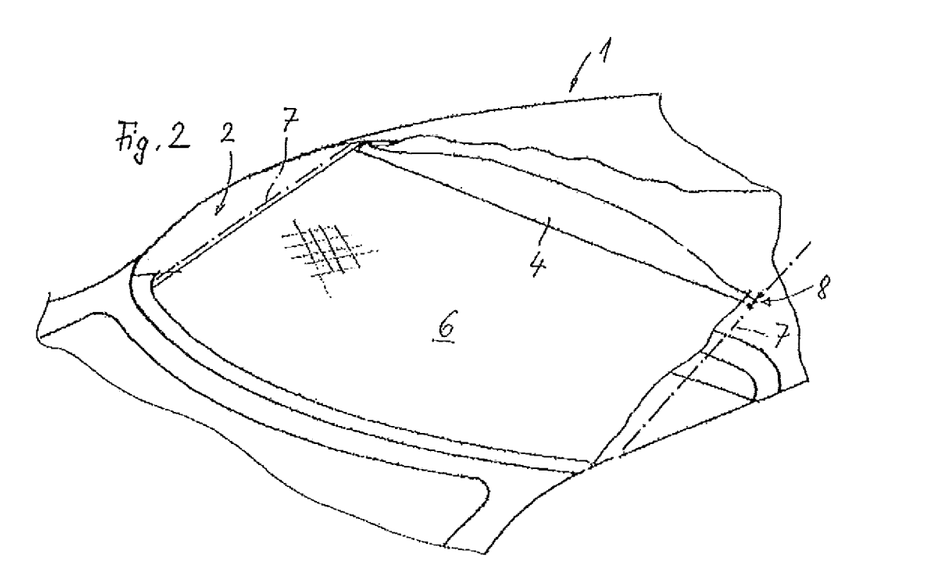
FIG. 2 is the illustration as per FIG. 1, in which the shading device has been transferred into its shading position.

A passenger motor vehicle 1 has, as per FIGS. 1 and 2, a rear window arrangement 2 which delimits a vehicle interior compartment, above a vehicle sill, toward the rear. In the vehicle interior, there is provided below the rear window arrangement 2 a parcel shelf 3 which may be part of a load-bearing body structure of the passenger motor vehicle 1. The parcel shelf 3 is adjoined in the forward direction by a backrest arrangement of a rear seat bench.

To reduce light radiation through the rear window arrangement 2 from the outside, the rear window arrangement 2 is assigned a shading device as per FIGS. 1 to 9, which will be described in more detail below. The shading device has a flexible shading structure 6 which, in the manner of a web, is held on a winding shaft 10 such that it can be wound up and unwound. The winding shaft 10 is mounted rotatably underneath the rear parcel shelf 3 with an axis of rotation extending in the vehicle transverse direction. In the region of the parcel shelf 3 there is provided a passage slot (not illustrated in any more detail) through which the shading structure 6 is passed during a movement from the rest position (FIG. 1) into the shading position (FIG. 2). The shading structure 6 has an at least substantially rectangular shape and is wound uniformly in multiple layers on the winding shaft 10. At a front face end region as viewed in the pulling-out direction, the shading structure 6 is fastened to a pull-out profile 4 which extends over the entire width of the shading structure 6. The pull-out profile 4 is, at its opposite face ends, held in longitudinally displaceable fashion by means of in each case one guide carriage 8 (FIGS. 3 and 4) in lateral guide arrangements which are fixed with respect to the vehicle. As can be seen from FIG. 1 and FIG. 2, the lateral guide arrangements which are fixed with respect to the vehicle are fastened in the region of C pillar sections of the body support structure. Each lateral guide arrangement has a guide slot 5 which is open toward the middle of the vehicle, the design and function of which guide slot will be described in more detail below. The guide slot 5 is preferably integrated in each case flushed into an interior lining part which is arranged in the region of the respective C-pillar section.

Figure 6:
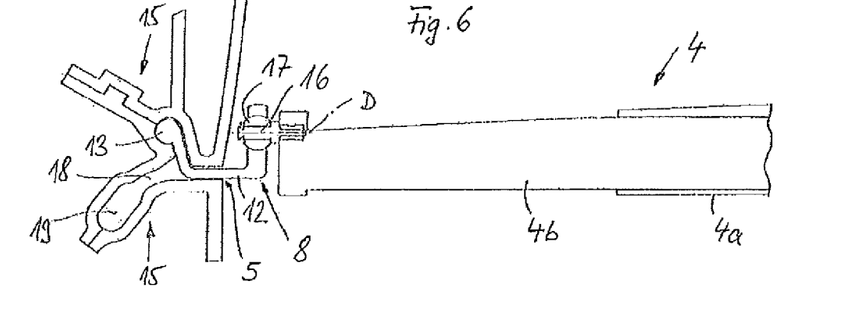
FIG. 6 is an enlarged schematic cross-sectional illustration of a subregion of the shading device as per FIGS. 1 to 5.

The pull-out profile 4 is made up of a middle part 4a, which is configured as a hollow profile, and two lateral telescopic sections 4b which are arranged on opposite sides of the middle part 4a and are guided in longitudinally displaceable fashion in the middle part 4a. The guide carriages 8 are connected to the face side of the respective telescopic section 4b. The two telescopic sections 4b are mounted in the middle part 4a so as to be displaceable in the longitudinal direction of the pull-out profile 4, in order that the overall length of the pull-out profile 4 can be varied. The variation of the overall length of the pull-out profile 4 is necessary as the lateral guide arrangements and also the guide slots 5 do not run parallel with respect to one another but are inclined toward the middle and accordingly taper toward one another proceeding from the parcel shelf 3 in the direction of the roof lining of the vehicle interior. The pull-out profile 4 is, via its two telescopic sections 4b, mounted rotatably relative to the two guide carriages 8 by means of in each case one ball joint arrangement 14. The two ball joint arrangements 14 define, for the pull-out profile 4, an axis of rotation D relative to the opposite guide carriages 8, said axis of rotation being arranged eccentrically with respect to a central longitudinal axis of the pull-out profile 4. As can be seen from FIG. 6, the ball joint arrangement 14 comprises firstly a bearing journal 16 which projects laterally outward from the telescopic section 4b coaxially with respect to the axis of rotation D, and secondly a ball joint 17 which is mounted on the guide carriage 8 and into which the bearing journal 16 engages coaxially. An axial securing ring (not designated in any more detail) secures the bearing journal 16 axially on the ball joint 17.

Figure 3:
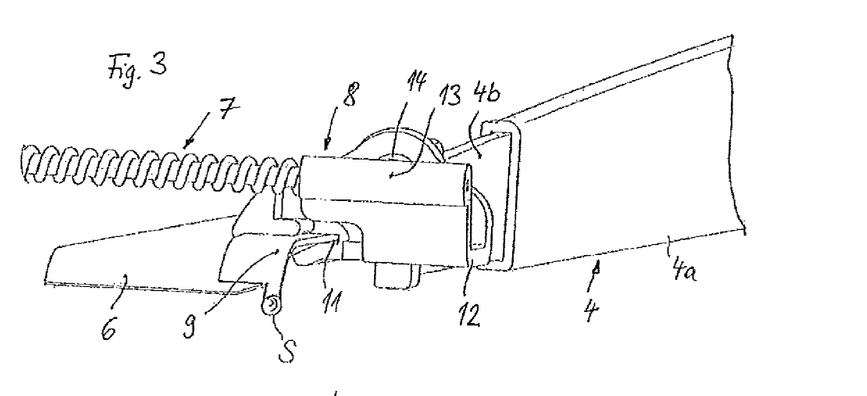
FIG. 3 is an enlarged perspective illustration of a detail of the shading device as per FIGS. 1 and 2.
Figure 4:
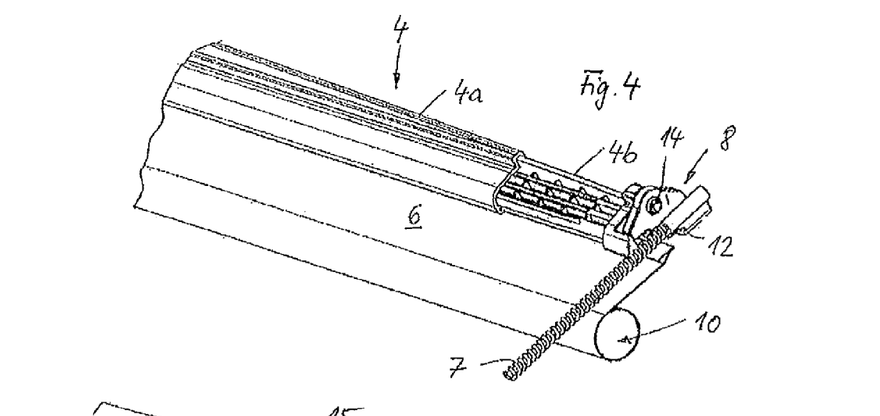
FIG. 4 is another perspective illustration of the shading device as per FIG. 3.

The guide carriage 8 has a laterally outwardly projecting guide projection 12 which is angled upward and transitions into a cylindrical guide body 13 to which a drive transmission strand, which is rigid under compression, in the form of a flexible shaft 7 is coaxially connected (FIGS. 3 and 4). In a manner which is not illustrated in any more detail, the flexible shaft 7 is driven in longitudinally displaceable fashion synchronously with the opposite flexible shaft 7 by way of a gearwheel mechanism which is acted on by an electric drive motor.

The two lateral guide arrangements and both sides of the pull-out profile 4 and both sides of the shading structure 6 are designed mirror-symmetrically but otherwise identically to one another, such that in order to avoid repetitions, only one side will be described in detail.

The guide body 13 of the guide carriage 8 is guided in linearly displaceable fashion in a guide channel 20 of the lateral guide arrangement which is fixed with respect to the vehicle and which, within the meaning of the invention, serves as receiving space. The guide channel 20 furthermore guides the respective flexible shaft 7. The laterally outwardly projecting guide projection 12 of the guide carriage 8 projects into the guide slot 5, which is open toward the upwardly leading guide channel 20. Furthermore, the guide slot 5 is adjoined laterally to the outside and in the downward direction by a narrow receiving space 18 which comprises a widened support channel section 19. Both the guide slot 5 and the guide channel 20, the receiving space 18 and the support channel section 19 extend, as viewed in the longitudinal direction of the shading structure 6, continuously at least over an entire movement travel of the pull-out profile 4 and thus of the displacement travel of the shading structure 6 between its rest position (FIG. 1) and its shading position (FIG. 2).

Figure 7:
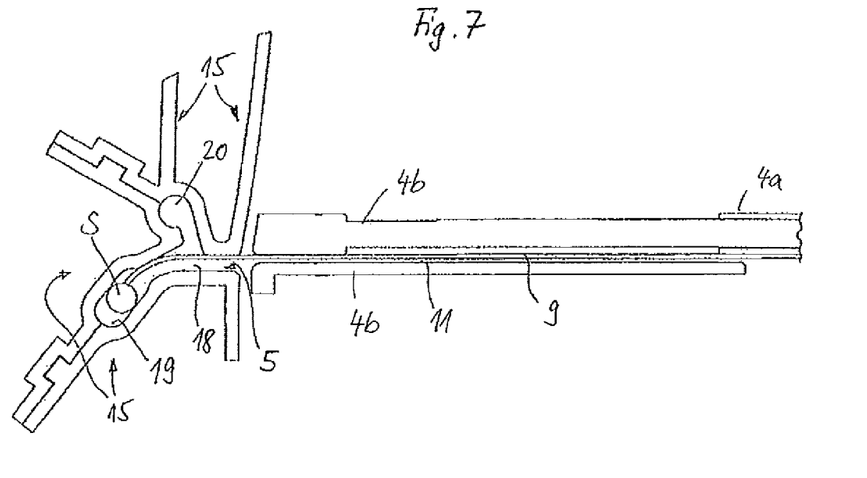
FIG. 7 is a further cross-sectional illustration of the shading device in a section plane parallel to the section plane as per FIG. 6.
Figure 8:
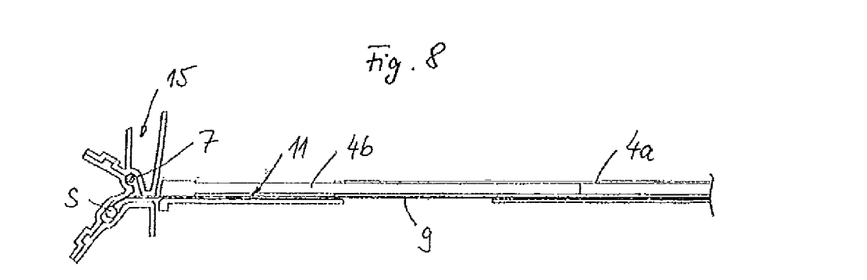
FIG. 8 is a further cross-sectional illustration, in a further section plane which is parallel to that in the illustrations of FIGS. 6 and 7, of a subregion of the shading device as per FIGS. 1 to 7, and FIG. 9 schematically shows a shading structure of the shading device as per FIGS. 1 to 8.
Figure 9:
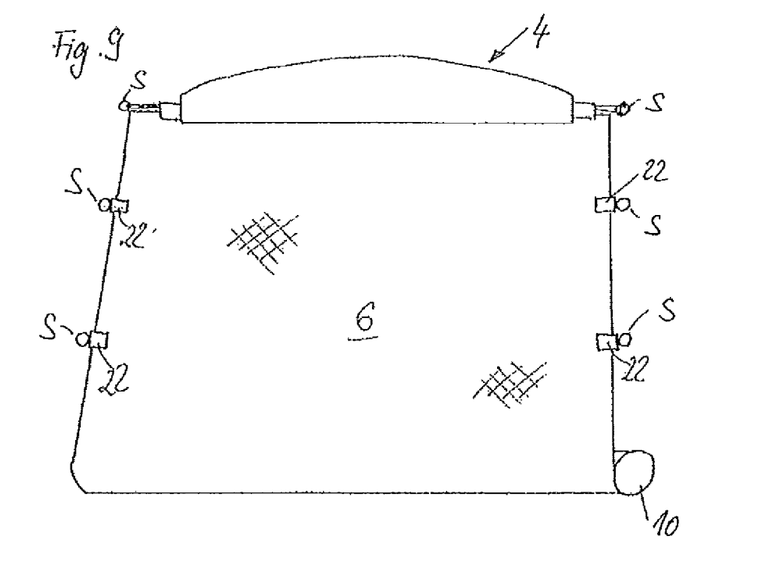

The guide slot 5, the guide channel 20, the receiving space 18 and the support channel section 19 are integrated in a housing structure 15 which is composed of multiple interconnected shell sections. The shell sections may be produced from plastic or from metal. It can be seen from FIGS. 6 to 8 that the housing structure 15 is composed of three interconnected shell sections which are mounted fixedly with respect to the vehicle by being fixedly connected in particular to adjoining vehicle interior lining parts and/or load-bearing body parts.

The shading structure 6 is connected to the pull-out profile 4 via a transverse guidance strip 9 which extends continuously over an entire width of the shading structure 6 transversely with respect to the pulling-out direction of the shading structure 6. The transverse guidance strip 9 exhibits greater stiffness than the flexible shading structure 6 and is produced from a PTFE strip with a width of 10 mm and a thickness of 0.5 mm. The transverse guidance strip 9 is connected to the front face end region of the shading structure 6 in continuous fashion over the entire width of the shading structure 6 by adhesive bonding or being sewn into a face-side loop. The transverse guidance strip 9 is held on the pull-out profile 4 by being inserted with a form fit into a receiving slot of the middle part 4a of the pull-out profile 4. The transverse guidance strip 9 is furthermore also connected to the pull-out profile 4 by way of its lateral guidance strip sections which extend in the region of the telescopic sections 4b of the pull-out profile 4. For this purpose, each telescopic section 4b is equipped with a sliding guide channel 11 by virtue of the respective lateral guidance strip section of the transverse guidance strip 9 being supported in linearly movable fashion. The transverse guide channel 11 extends over a maximum pull-out length of the telescopic section 4b relative to the middle part 4a, such that the transverse guidance strip 9 is supported in linearly movable fashion at least largely over an entire width of the pull-out profile 4.

The transverse guidance strip 9 has, at its opposite face ends laterally outside the respective longitudinal edge of the shading structure 6, a tab projection onto which a pearl-like support body S is molded or fastened in some other way. Said support body S is inserted into the support channel section 19 of the housing structure 15 in the longitudinal direction of the shading structure 6 and prevents the transverse guidance strip 9 from being able to be pulled out of the support channel section 19 by a transverse force directed toward the middle of the vehicle. This is because the tapering of the receiving space at the transition from the support channel section 19 to the narrow receiving space 18 causes the support body S to be supported with a form fit in the transverse direction. The transverse guidance strip 9 is, by way of its lateral guidance strip sections, curved downward in the guide slot 5 and in the receiving space 18 and hereby guides the adjoining lateral shading structure sections of the shading structure 6 into the receiving space 18 and into the support channel section 19 during a longitudinal displacement of the pull-out profile 4 along the guide slots 5. Accordingly, during a displacement of the shading structure 6 from the rest position into the shading position, the receiving space 18 and the support channel section 19 store the shading structure sections of the rectangular shading structure which have been inserted laterally into the guide slot 5. The lateral shading structure sections enter and pass through the respective guide slot 5 in a manner analogous to that in the prior art (EP 1 800 922 B1), firstly owing to the lateral guide arrangements and guide slots 5 which are fixed with respect to the vehicle and which taper toward one another and secondly owing to the parallel extending of the lateral longitudinal edges of the rectangular shading structure, during the winding-up or unwinding of the shading structure 6 by way of a longitudinal displacement of the pull-out profile 4.

Figure 5:
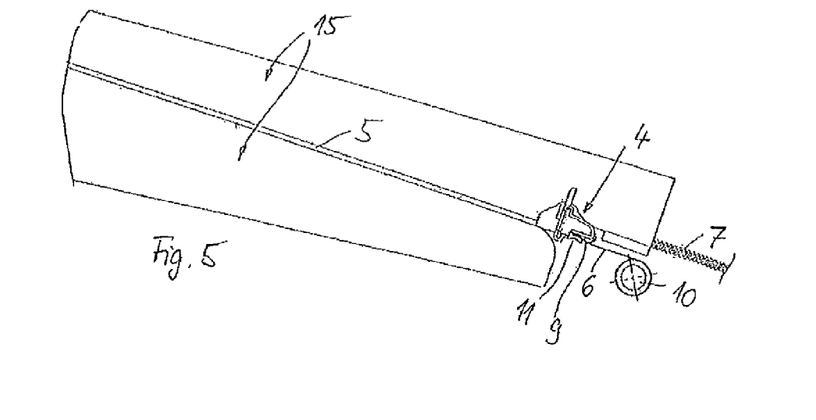
FIG. 5 shows a side view of the shading device as per FIGS. 1 to 4.

As is evident on the basis of FIG. 5, the transverse guidance strip 9 which is connected at the face side to the shading structure 6 forms a piping which is inserted with a form fit into the receiving slot, which is configured as a piping channel, of the middle part 4a. The sliding guide channels 11 of the telescopic sections 4b also form piping-like grooves, with the difference that, in the region of the sliding guide channels 11, the telescopic sections 4b are arranged so as to be longitudinally displaceable relative to the transverse guidance strip 9.

From FIG. 5 and from FIG. 1, it can be seen that the guide slots 5 in each housing structure 15 run firstly rectilinearly and secondly in the pulling-out plane of the shading structure 6. The receiving slot of the middle part 4a and the sliding guide channels 11 of the telescopic sections 4b are in alignment with one another in the longitudinal direction of the pull-out profile 4, resulting in rectilinear and planar support of the transverse guidance strip 9. This piping-like receptacle of the transverse guiding strip 9 in the pull-out profile 4 is provided at a distance from the axis of rotation D about which the pull-out profile 4 is mounted rotatably on the opposite guide carriages 8. The shading structure 6 is subjected to a permanent tensile force by virtue of a restoring spring arrangement being integrated in the winding shaft 10, which restoring spring arrangement exerts a torque on the winding shaft 10 in the winding-up direction. By means of this application of torque, the shading structure 6 exerts, by way of the transverse guidance strip 9 which is held in the pull-out profile 4, a torque on the pull-out profile 4 about the axis of rotation D, such that the pull-out profile 4 is oriented in the orientation as per FIGS. 4 and 5 while the pull-out profile 4 is moved from the rest position into the shading position or vice versa. The shading position or the end position may be assigned abutments which compensate the torque loading of the pull-out profile 4 and pivot the pull-out profile 4, in the corresponding end position, into a different orientation relative to the guide carriages 8.

In order that, over the further course of the length of the shading structure 6, the lateral shading structure sections are prevented from undesirably being pulled out of the corresponding receiving space 18, 19 with the respective housing structure 15, it is the case that, distributed over the length of the shading structure 6, on each side, the respective lateral longitudinal edge of the shading structure 6 is assigned two further support bodies S which are connected by way of fastening tabs 22 to the lateral shading structure sections. The support bodies S are also of pearl-like form and are coordinated in terms of their dimensions with the support channel section 19 so as to be longitudinally displaceable therein with play. During a displacement of the shading structure 6 by means of the pull-out profile 4 in the guide slots 5 of the housing structures 15, the further support bodies S also slide into the support channel sections 19 such that transverse support is realized substantially over the entire pulling-out length of the shading structure 6, which transverse support reliably prevents the shading structure from sliding out of the respective guide slot 5. As the shading structure 6 is wound up on the winding shaft 10, the support bodies S with the fastening tabs 22 are imperatively jointly wound up outside the respective face edge of the winding shaft 10, such that no change in the thickness of the winding layers occurs owing to said support bodies S.

The invention claimed is:

1. A shading device for a transparent surface part of a motor vehicle, comprising:
   a flexible and substantially rectangular shading structure which can be displaced between a rest position, in which the shading structure is stowed in a compact manner, and a shading position, in which the shading structure covers the transparent surface part in a vehicle interior;
   two non-parallel lateral guide arrangements which are fixed with respect to the vehicle, which flank a displacement travel of the shading structure on opposite sides, and which taper towards each other at tops thereof;
   a substantially non-flexible pull-out profile which is arranged on a front face end region of the shading structure as viewed in a pulling-out direction; and
   a flexible transverse guidance strip extending on the front face end region of the shading structure transverse to the pulling-out direction of the shading structure over a width thereof, the shading structure being connected to the pull-out profile via the guidance strip;
   the pull-out profile, at opposite face sides thereof, being displaceable in parallel fashion in each case by one guide carriage in a respective one of the lateral guide arrangements by way of a drive which engages on the guide carriage; and
   lateral shading structure sections protruding, in a manner dependent on the displacement travel of the shading structure, into lateral receiving spaces which are configured to be fixed with respect to the vehicle and which are assigned to the lateral guide arrangements;
   wherein each of the lateral guide arrangements and an associated one of the receiving spaces are integrated in a housing structure which is fixed with respect to the vehicle and which has a common guide slot for passage of a carriage part of the guide carriage located between the pull-out profile and the drive and of a portion of the lateral shading structure sections extending into the receiving space, the guide slot running along the displacement travel of the shading structure and being open toward the shading structure;
   wherein the housing structure is comprised of three interconnected shell sections including a first shell section, a second shell section and a third shell section; and
   wherein the lateral guide arrangements are formed between the first shell section and the second shell section, and the receiving spaces are formed between the second shell section and the third shell section.

2. The shading device as claimed in claim 1, wherein the guide slots extend at least largely rectilinearly and are arranged in a common plane which corresponds to a pulling-out plane of the shading structure between the rest position and the shading position.

3. The shading device as claimed in claim 1, wherein the guide slots are open toward the receiving spaces of the housing structures.

4. The shading device as claimed in claim 1, wherein each of the receiving spaces comprises a first receiving space area for a linear guide of a drive transmission strand of the drive and a second receiving space area for the lateral shading structure section to protrude into, the first receiving space area for the drive transmission strand being arranged on a first side of the guide slot and the second receiving space area for the lateral shading structure section being arranged laterally adjacent to or on a second side of the guide slot.

5. The shading device as claimed in claim 1, wherein walls of the receiving spaces are formed partially by body wall sections of the housing structure.

6. A shading device for a transparent surface part of a motor vehicle, comprising:
   a flexible and substantially rectangular shading structure which can be displaced between a rest position, in which the shading structure is stowed in a compact manner, and a shading position, in which the shading structure covers the transparent surface part in a vehicle interior;
   two non-parallel lateral guide arrangements which are fixed with respect to the vehicle, which flank a displacement travel of the shading structure on opposite sides, and which taper towards each other at tops thereof;
   a non-flexible pull-out profile which is arranged on a front face end region of the shading structure as viewed in a pulling-out direction; and
   a flexible transverse guidance strip extending on the front face end region of the shading structure transverse to the pulling-out direction of the shading structure over a width thereof, the shading structure being connected to the pull-out profile via the guidance strip;
   the pull-out profile, at opposite face sides thereof, being displaceable in parallel fashion in each case by one guide carriage in a respective one of the lateral guide arrangements by way of a drive which engages on the guide carriage; and
   lateral shading structure sections protruding, in a manner dependent on the displacement travel of the shading structure, into lateral receiving spaces which are configured to be fixed with respect to the vehicle and which are assigned to the lateral guide arrangements;
   wherein each of the receiving spaces comprises a first receiving space area for a linear guide of a drive transmission strand of the drive and a second receiving space area for the lateral shading structure section to protrude into, the first receiving space area for the drive transmission strand being arranged on a first side of a guide slot of the lateral guide arrangements for passage of the guide carriages and the second receiving space area for the lateral shading structure section being arranged laterally adjacent to or on a second side of the guide slot;
   wherein each of the lateral guide arrangements is formed by a housing structure also having one of the receiving spaces therein, the housing structure being comprised of three interconnected shell sections including a first shell section, a second shell section and a third shell section; and
   wherein the lateral guide arrangements are formed between the first shell section and the second shell section, and the receiving spaces are formed between the second shell section and the third shell section.

7. The shading device as claimed in claim 6, wherein the guide slots extend at least largely rectilinearly and are arranged in a common plane which corresponds to a pulling-out plane of the shading structure between the rest position and the shading position.

8. The shading device as claimed in claim 6, wherein walls of the receiving spaces are formed partially by body wall sections of the housing structure.

* * * * *